2,905,407

DEVICE FOR RESILIENTLY ARRESTING THE MOVEMENT OF HOSE OR CABLE-CARRYING WINCHES

Peter Stevens Macgregor, Upton, Poole, and Arthur Walter Goodliffe, Wimborne, England, assignors, by mesne assignments, to Flight Refuelling Incorporated, Baltimore, Md., a corporation of Delaware Application August 31, 1953, Serial No. 377,562

Claims priority, application Great Britain September 2, 1952

5 Claims. (Cl. 242—86.7)

This invention relates to winches and is especially applicable to airborne winches carrying a refuelling hose or towing cable.

An object of the invention is to provide a winch with improved means for resiliently arresting the rotation of the reel when the hose or cable mounted on it has been payed out to the desired extent, for which purpose the improved winch includes means responsive to the rotation of the reel and adapted, when a predetermined length of hose or cable has been payed out, to engage a dog-clutch so as to connect the reel to a member, which is resiliently restrained with respect to the framework in which the reel is mounted. The resiliently restrained member preferably takes the form of a lever pivotally mounted on the framework coaxially with the reel and anchored to the framework by means of a spring element, for which purpose it is preferred to use a so-called "liquid-spring unit," the resilient action of which is furnished by volumetric compression of a column of liquid confined between a cylinder and a piston.

A further object of the invention is to combine the dog-clutch mechanism with the means responsive to the rotation of the reel in a simple, compact and reliable manner, by mounting one of the dog-clutch members co-axially on the reel so as to be free to slide axially but restrained against rotation relatively to the reel, and providing in screw-threaded engagement therewith a coaxial member which is axially located by the framework and restrained against rotation relatively thereto, the complementary dog-clutch member being unitary with the resiliently restrained member preferably constituted by the lever above-mentioned. In a preferred form of construction the member in screw-threaded engagement with the axially slidable dog-clutch member is unitary with the complementary dog-clutch member and resiliently restrained member.

How these objects and others which may hereinafter appear may be achieved will be understood from the following description having reference to the accompanying drawings of a selected embodiment of the invention as applied to a hose-carrying winch, which is given by way of example and without implied limitation of the scope of the invention as defined in the appended claims.

In the accompanying drawings.

Figure 1:
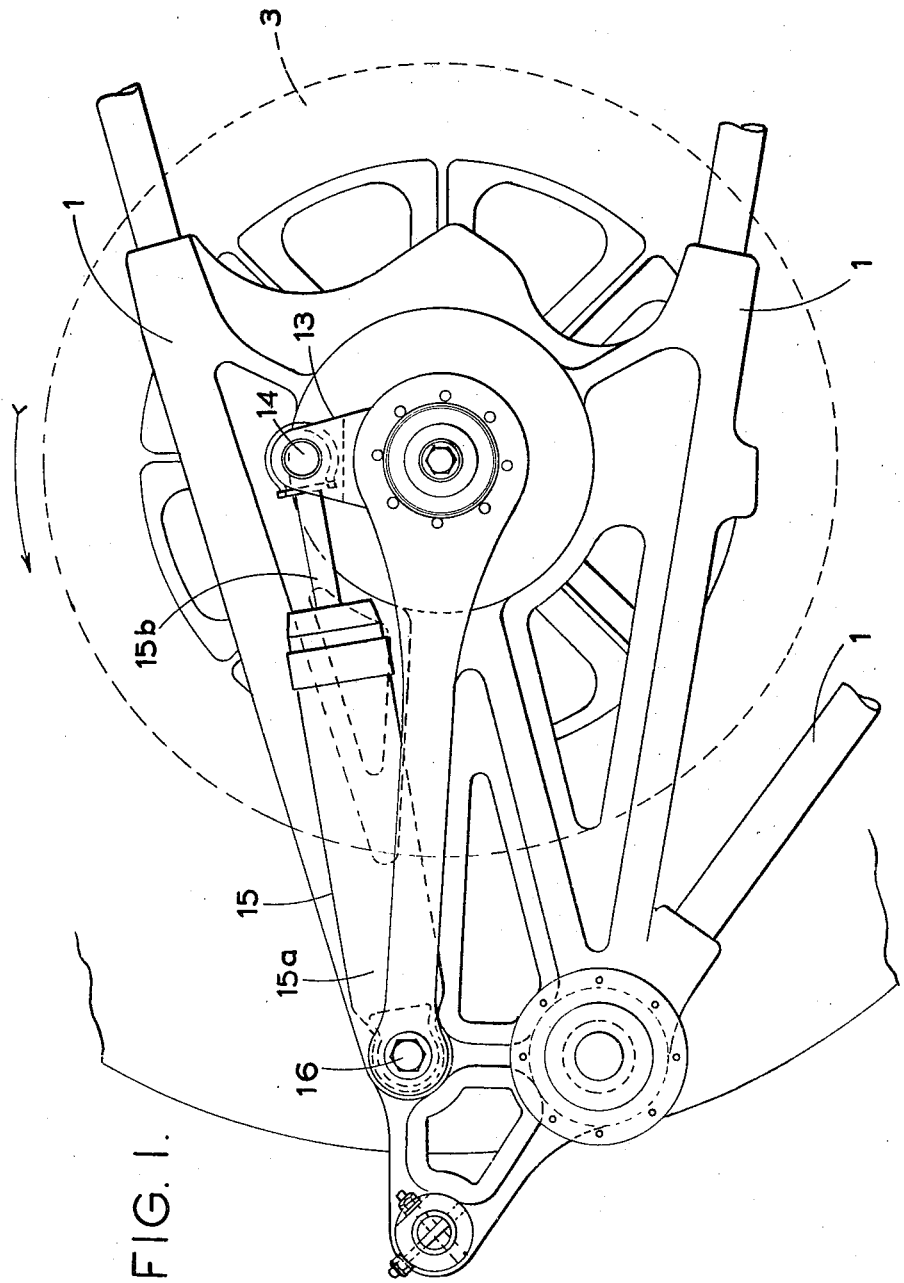
Figure 1 is a side elevation of the winch.

Referring to the drawings, the reel 3 is mounted in a framework 1, to which is pivotally anchored at 16 one part 15a of the liquid spring unit 15 whose other part 15b is pivotally connected at 14 to the lever 13, which is pivotally mounted coaxially with the reel as hereinafter more fully disclosed; the parts 15a, 15b of the spring unit 15 are constituted by relatively displaceable cylinder and piston elements confining a liquid, which is volumetrically compressed when the unit 15 is shortened by angular movement of the lever 13 in the direction of the arrow. In the example illustrated, the full stroke of the spring unit 15 corresponds to about 120° movement of the lever 13 (see Figure 1).

Figure 2:
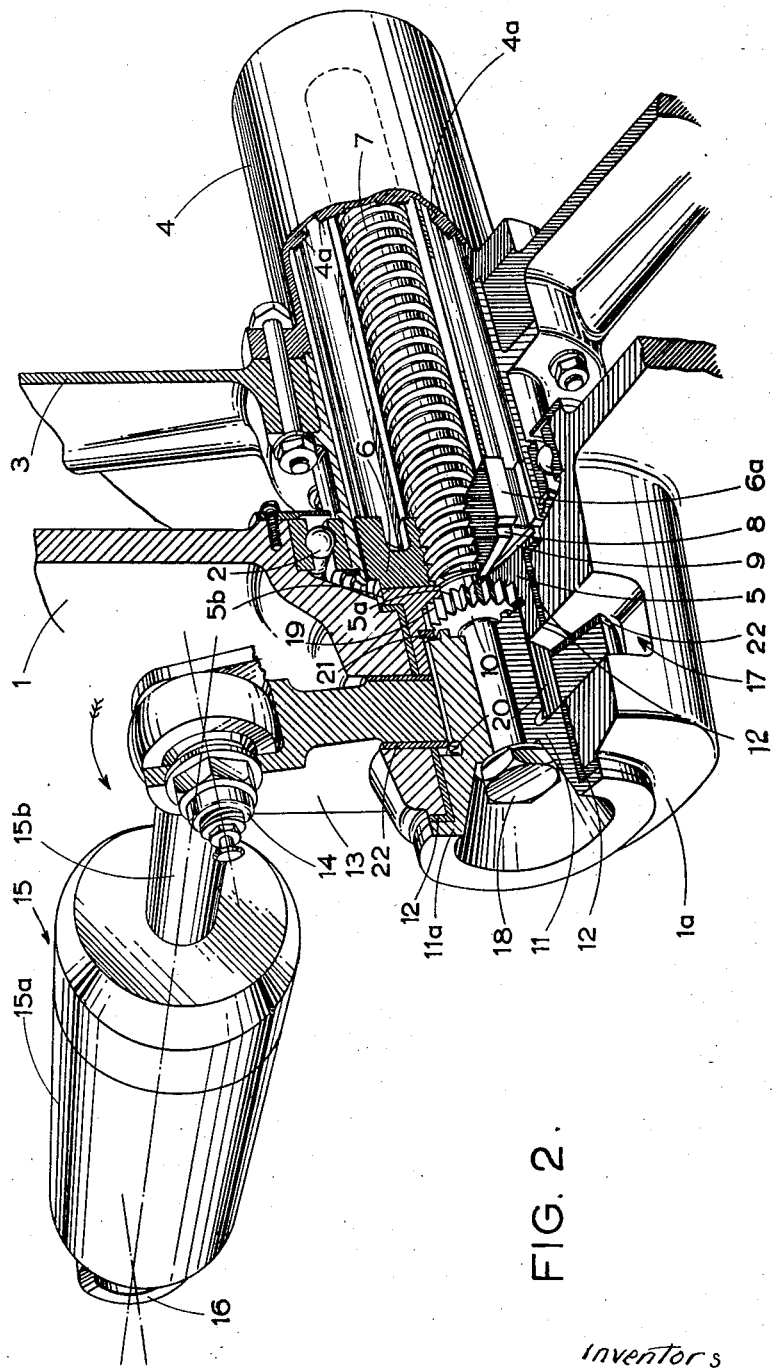
Figure 2 is a partly sectioned, partly broken away perspective view thereof.

The reel 3 comprises a hollow axle 4 supported by the framework 1 in bearings, of which one is shown at 2 in Figure 2. The reel is driven by a motor through a clutch device, gearing and a chain-drive of conventional construction and forming no part of the invention, for which reason these parts are not illustrated. A dog-clutch member 6 provided with teeth 8 is disposed inside the axle 4, with respect to which it is restrained against rotation, while left free to slide axially, by means of a splined connection 6a, 4a. The member 6 is internally screw-threaded for engagement with an externally screw-threaded rod 7 mounted coaxially with the reel as hereinafter described.

The dog-clutch member 6 co-operates with a second dog-clutch member 5 having teeth 9 complementary to the teeth 8. The dog-clutch member 5, the threaded rod 7 and the lever 13 previously mentioned, together with a journal member 11, form a unitary structure rotatably mounted, by means of bushings 12 coaxial with the reel, in a boss 1a of the framework 1, which is provided with a slotted recess 17 to accommodate the lever 13. The unitary structure is made in four pieces merely for convenience of fabrication and assembly, the pieces being connected together as follows: the rod 7 is clamped to the journal member 11 by a screw-threaded stud 18; the outer surface of the journal member 11 and of an enlarged head 10 on the rod 7 are splined at 19, 20 to engage corresponding internal splines in the lever 13 and dog-clutch member 5; the latter is axially located with respect to the head 10 of rod 7 by a shoulder 5a and a cotter 21; and the whole unitary assembly is axially located with respect to the boss 1a by a shoulder 11a on the journal member 11 and a shoulder 5b on the dog-clutch member 5, the lever 13 being axially located with respect to the boss 1a by the flanks of the slotted recess 17 between which and the lever 13 are disposed washers 22.

As long as the dog-clutch members 6, 5 are separated, the lever 13, journal member 11, dog-clutch member 5 and rod 7 are held stationary by the spring-unit 15. Rotation of the reel 3 in the paying-out sense, by causing the dog-clutch member 6 to rotate likewise relatively to the rod 7, moves the dog-clutch member 6 towards the dog-clutch member 5, until, when the hose or cable has been payed out to a predetermined extent, the teeth 8 of the dog-clutch member 6 engage the teeth 9 of the dog-clutch member 5 and cause the latter, together with the rod 7, journal member 11 and lever 13, to rotate with the reel 3, so that further rotation of the latter shortens the spring unit 15 and compresses the liquid in it, thus resiliently arresting the reel.

Within the spirit of the invention and the scope of the appended claims, modifications of the kind that will readily occur to those skilled in the art may be made in the structure above-described by way of example. For instance, the rod 7, instead of being made unitary with the dog-clutch member 9 and lever 13 may be positively fixed with respect to the framework 1, in which case the dog-clutch member 6 will continue to advance axially along the rod 7 after engagement of the dog-clutch members 6 and 9, and to accommodate this further movement the axial depth of the teeth 8 of member 6 and the corresponding teeth 9 of member 5 must be sufficiently great. Thus, if 120° relative movement of the dog-clutch member 6 and rod 7, after tooth-engagement first takes place, is to be provided for, the teeth must be deep enough to allow a further relative axial movement thereof after first engagement of at least one-third of the pitch of the complementary screw-threads of member 6 and rod 7. Similarly, for the liquid spring unit 15 a spring of some other type, e.g. a clock-type spring, or a pneumatic buffer, may be substituted, but in general a metal spring is heavier than a liquid-spring for the same energy-absorbing capacity, and a pneumatic buffer of high energy-absorbing capacity per unit weight will call for correspondingly high operating pressures, such as are liable to introduce an undesirable fire-hazard; moreover, with a high-pressure pneumatic system the consequences of a burst are likely to be more disastrous than when a liquid system is used.

Again, the ratio connecting the angular displacement of the reel when coupled to the liquid-spring unit 15, or equivalent resilient restraint, with the loading range of the spring unit or its equivalent, is not critical; and the hereinbefore mentioned figure of 120° movement of the lever 13 for the full stroke of the spring unit 15 is not to be understood as an essential limitation. It will be evident that if a linear spring unit, such as 15, anchored at one end is directly connected to a lever, such as 13, the movement of the lever corresponding to the full stroke of the spring unit cannot exceed 180° and must in practice be somewhat less; and this sets a similar upper limit to the resiliently restrained movement of the reel if the latter is directly coupled to the lever through the dog-clutch members when the latter are engaged. A more extended movement of the reel under resilient restraint could, however, be obtained, for example, by introducing gearing connecting the dog-clutch member 5 and the lever 13.

We claim:

1. In a winch comprising a fixed frame member and a reel rotatable thereon, a dog-clutch member mounted on said frame member coaxially of said reel for limited rotation, a lever arm fixed to said dog-clutch member and extending radially therefrom, and resilient brake means for arresting said reel against overrun when paying out a hose or cable under tension, said means comprising a spring device of the linear compression and extension type, one end of which is anchored to said frame member and the other end is connected to said lever arm, a lead-screw fixed with relation to one of said members, and disposed coaxially with said reel, a complementary internally threaded dog-nut in screw threaded engagement with said lead-screw and adapted to travel therealong upon relative rotation thereof, means operatively connecting said dog-nut to said reel for rotation therewith but relative axial movement with respect thereto, the hand of the threads of said dog-nut and lead-screw being such as to cause the dog-nut to travel towards the complementary dog-clutch member and engage therewith to throw said lever and actuate said spring device, when the reel rotates in the paying out sense.

2. A winch as claimed in claim 1 in which the spring device is constituted by a liquid-spring unit, of which the resilient element is a column of compressible liquid.

3. A winch as set forth in claim 1, in which the load-deformation characteristics of the spring device and the geometrical characteristics of its operative connections with the reel through the dog-clutch member and the dog-nut when mutually engaged, are so selected that less than half a complete revolution of the reel, after such engagement, brings the spring device from the no-load condition to its maximum load condition.

4. In a winch comprising a fixed frame member and a reel having a hub rotatable thereon, a dog-clutch member mounted on said frame member coaxially of said reel for limited rotation, a lever arm fixed to said dog-clutch member and extending radially therefrom, and resilient brake means for arresting said reel against overrun when paying out a hose or cable under tension, said means comprising a spring device of the linear compression and extension type, one end of which is anchored to said frame member and the other end is connected to said lever arm, a lead-screw fixed with relation to said dog-clutch member, and disposed coaxially with and inside of the hub of said reel, a complementary internally threaded dog-nut in screw threaded engagement with said lead-screw and adapted to travel therealong upon relative rotation thereof, means operatively connecting said dog-nut to said reel for rotation therewith but relative axial movement with respect thereto, the hand of the threads of said dog-nut and lead-screw being such as to cause the dog-nut to travel towards the complementary dog-clutch member and engage therewith to throw said lever and actuate said spring device, when the reel rotates in the paying out sense.

5. In a winch comprising a fixed frame member and a reel rotatable thereon, a first clutch member rotatably mounted on said frame coaxially with said reel, a lever arm fixed on said clutch member and projecting radially therefrom, and a linearly compressible spring device having one end pivotally connected to the free end of said arm and its other end pivotally connected to said frame to resiliently brake rotary movement of said lever arm and clutch member, in combination with a second clutch member connected to said reel for rotation therewith, said second clutch member being positioned coaxially with said reel and axially removable to and from engagement with said first clutch member, said first and second clutch members being normally disengaged, and means operable to interengage said first and second clutch members for rotation together.

References Cited in the file of this patent

UNITED STATES PATENTS

| 238,551 | Barlow | Mar. 8, 1881 |
| 295,730 | Brown | Mar. 25, 1884 |
| 301,863 | Cheney | July 15, 1884 |
| 702,275 | Arnold | June 10, 1902 |
| 808,273 | Darlington | Dec. 26, 1905 |
| 2,091,418 | Schoene | Aug. 31, 1937 |
| 2,327,505 | Conrad et al. | Aug. 24, 1943 |
| 2,346,667 | Dowty | Apr. 18, 1944 |
| 2,373,413 | Plummer | Apr. 10, 1945 |
| 2,373,414 | Plummer | Apr. 10, 1945 |
| 2,396,071 | Anderson et al. | Mar. 5, 1946 |
| 2,479,316 | Connelly | Aug. 16, 1949 |
| 2,569,557 | Connelly | Oct. 2, 1951 |

FOREIGN PATENTS

| 625,061 | Great Britain | June 21, 1949 |

OTHER REFERENCES

"Mechanical Engineers Handbook," by L. Marks, 5th edition, 1951 (page 233).